United States Patent
Boney et al.

(10) Patent No.: US 7,677,312 B2
(45) Date of Patent: Mar. 16, 2010

(54) DEGRADABLE CEMENT COMPOSITIONS CONTAINING DEGRADING MATERIALS AND METHODS OF CEMENTING IN WELLBORES

(75) Inventors: Curtis L. Boney, Houston, TX (US); Simon G. James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/830,559

(22) Filed: Jul. 30, 2007

(65) Prior Publication Data

US 2009/0032252 A1 Feb. 5, 2009

(51) Int. Cl.
*E21B 43/267* (2006.01)
*E21B 33/00* (2006.01)

(52) U.S. Cl. .................. 166/280.2; 166/280.1; 166/285; 166/305.1

(58) Field of Classification Search .................. None
See application file for complete search history.

(56) References Cited

U.S. PATENT DOCUMENTS

| | | | |
|---|---|---|---|
| 5,529,123 A * | 6/1996 | Carpenter et al. ........... 166/293 |
| 7,032,663 B2 | 4/2006 | Nguyen | |
| 7,172,022 B2 | 2/2007 | Reddy | |
| 7,267,170 B2 * | 9/2007 | Mang et al. ................... 166/279 |
| 7,497,258 B2 * | 3/2009 | Savery et al. ................ 166/292 |
| 2004/0261999 A1 * | 12/2004 | Nguyen ....................... 166/292 |
| 2005/0000690 A1 | 1/2005 | Boney | |
| 2005/0205258 A1 * | 9/2005 | Reddy et al. ................. 166/292 |
| 2006/0112862 A1 | 6/2006 | Nguyen | |
| 2006/0169452 A1 | 8/2006 | Savery | |
| 2006/0169453 A1 | 8/2006 | Savery | |
| 2006/0169454 A1 | 8/2006 | Savery | |
| 2007/0029086 A1 | 2/2007 | East, Jr. | |

* cited by examiner

*Primary Examiner*—Jennifer H Gay
*Assistant Examiner*—Angela M DiTrani
(74) *Attorney, Agent, or Firm*—David Cate; Rachel Greene; Robin Nava

(57) ABSTRACT

A temporary matrix is provided in treating a subterranean formation by providing a composition comprising a matrix forming material and a matrix degrading material. The matrix degrading material is capable of degrading the matrix after a period of time when subjected to existing or induced conditions of the subterranean formation. The composition is placed into a wellbore penetrating the subterranean formation. The composition is allowed to form a matrix within the wellbore, whereby the matrix at least one of significantly reduces the passage of fluid across or near the matrix or provides structural strength. A treatment operation is performed on the subterranean formation or wellbore and the degrading material is allowed to degrade the matrix.

22 Claims, No Drawings

DEGRADABLE CEMENT COMPOSITIONS CONTAINING DEGRADING MATERIALS AND METHODS OF CEMENTING IN WELLBORES

BACKGROUND

The statements in this section merely provide background information related to the present disclosure and may not constitute prior art.

The invention relates to methods and compositions for use in subterranean treatment operations. More particularly, the present invention relates to degradable cement compositions comprising degrading materials, and methods of using such compositions in subterranean formation treatment operations.

Hydraulic cement compositions are commonly utilized in subterranean operations, particularly subterranean well completion and remedial operations. For example, hydraulic cement compositions are used in primary cementing operations whereby pipe strings such as casings and liners are cemented in well bores. In performing primary cementing, hydraulic cement compositions are pumped into an annular space between the walls of a well bore and the exterior surface of a pipe string disposed therein. To ensure that the annular space is completely filled, a cement slurry is pumped into the annular space until the slurry circulates to the surface. The cement composition is then permitted to set in the annular space, thereby forming an annular sheath of hardened, substantially impermeable cement. The hardened cement substantially supports and positions the pipe string in the well bore and bonds the exterior surfaces of the pipe string to the walls of the well bore. Hydraulic cement compositions are also used in remedial cementing operations, such as plugging highly permeable zones or fractures in well bores, plugging cracks and holes in pipe strings, and the like.

SUMMARY OF THE INVENTION

An example of a method of the present invention is a method of treating a subterranean formation which involves providing a degradable cement composition formed of cement and a degrading material; placing the degradable cement composition into a wellbore; allowing the cement composition to set therein; performing a treatment operation on the subterranean formation; and allowing the degradable material and cement to degrade. An example of a composition of the present invention is a cement composition comprising a hydraulic cement and a degrading material. An optional hydrogel component may be added to the degradable cement composition.

In some other embodiments of the invention, methods of cementing a subterranean formation are disclosed. The methods may be performed substantially within the wellbore or a fracture in the formation, or even a combination of both. The methods include forming a temporary matrix by a) providing a composition comprising a matrix forming material and a matrix degrading material, wherein the matrix degrading material is capable of degrading the matrix after a period of time when subjected to conditions of the subterranean formation;

b) placing the composition into a wellbore penetrating the subterranean formation; and, c) allowing the composition to form a matrix within the wellbore, whereby the matrix at least one of significantly reduces the passage of fluid across or near the matrix or provides structural strength;

performing a treatment operation on the subterranean formation or wellbore; and allowing the matrix degrading material to degrade the matrix.

DETAILED DESCRIPTION OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions used in methods of the invention may be described herein as comprising certain materials, it should be understood that the composition could optionally comprise two or more chemically different materials. In addition, the composition can also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

The invention relates to methods and compositions for use in subterranean treatment operations. More particularly, the present invention relates to degradable matrix compositions comprising at least one degrading material, and methods of using such compositions in subterranean formation treatment operations.

Embodiments of the invention are generally based upon a composition comprising a matrix forming material such as a cement or cementitious material; at least one degrading material, which may be a polymeric acid precursor; and water sufficient to make the composition a slurry prior to placement in a wellbore penetrating a subterranean formation. Other additives suitable for use in conjunction with subterranean cementing operations also may be added to these compositions if desired. Also, an optional hydrogel material may be added to the cement composition. When the compositions of the present invention set, the resultant degradable plug may have adequate mechanical properties to temporarily sustain its configuration during the treatment operation within the wellbore environment. The cement composition also may have improved thixotropic properties that may enhance its ability to handle loss of circulation and gas migration during the time in which it sets. As used herein, the term "matrix" means any structure, plug, or seal formed within the wellbore or a fracture in the subterranean formation which serves to provide at least a significant reduction of the passage of gas or liquid across or near the matrix. The gas or liquid may come from a point of the wellbore or fracture located at one side of the matrix to a point of the wellbore located on the opposite side of the matrix. In this way the gas or fluid, which, normally in the absence of matrix, should flow in the wellbore, sees a reduction of the passage of flow due to the matrix.

The matrix forming material may be an acid soluble cementitious material. Non-degradable particles or fibers may also be included in the matrix. The resulting matrix formed in accordance with the invention can be used for temporary plugging a zone, for temporarily supporting a packer, strengthening weak formations, etc. The sealing composition after placing in the zone becomes rigid and blocks the undesirable channels and fractures in the zone of interest or supports the weak zone, providing temporary zonal isolation and strengthening weak subterranean structures, with subsequent degradation of the matrix structure.

In one embodiment, an acid soluble cement composition is the matrix forming material. The cement may be formed from a blend of different particle sizes of fine, medium and coarse materials. The particles may be selected from a group of inorganic acid soluble components. The group of the particles can be selected from a group of calcium carbonate, and magnesium carbonate. In certain embodiments, the carbonate calcium may be selected acid soluble particles that depend on the final strength required for the temporary matrix isolating or strengthening structure and can be selected from lime or marble sources.

In one embodiment, the coarse particles in the blend consist of coarse carbonate calcium with particle sizes above 130 micron. The medium size particles are cement with particle sizes of 60 to 25 microns. The fine particle is microfine calcium carbonate and microfine cement blend with particle sizes below 10 microns. The percentage of the coarse and fine particles all together is from 100 to 200 percent of the medium size particle with this consideration that the percentage of the fine, medium, and coarse particles. Product that utilizes such particle size distribution is named CemCRETE, available from Schlumberger. The maximum degree of acid solubility can be achieved with high concentrations of calcium carbonate.

In an exemplary embodiment of the invention, degradation of the degrading material may be accompanied by generation of another product, such as, but not limited to, an acid, base, salt or gas, that functions as degrading agent to degrade the set cement, or applicable matrix forming material.

Any suitable matrix (i.e. plug, seal, packer, pill, etc.) forming substances which are degraded by the degrading material may be used in embodiments of the invention. When used as the matrix forming material, any cement may be utilized in cement compositions used according to the present invention, including, but not limited to, hydraulic cements comprising calcium, aluminum, silicon, oxygen, and/or sulfur, which set and harden by reaction with water, and provided such cements are degraded by the degrading materials. Examples of hydraulic cements are Portland cements, pozzolanic cements, gypsum cements, high alumina content cements, phosphate cements, silica cements, and high alkalinity cements. In certain exemplary embodiments of the present invention, API Portland Cement Classes A, G, and H are used. Non-limiting examples of yet other suitable matrix materials include: synthetic polymers (i.e. epoxies, urethanes, polyesters, polyamides, acrylics, rubber, lattices, emulsions, etc.), whether thermosettable, thermoplastic, or combination of both; or even, natural polymers such as rubber, biopolymers, latexes, and the like.

The water used in the present invention may comprise fresh water, salt water (e.g, water containing one or more salts dissolved therein), brine (e.g., saturated salt water), or seawater. Generally, the water can be from any source provided that it does not contain an excess of compounds that may adversely affect other components in the cement composition. The water may be present in an amount sufficient to form a pumpable slurry. In certain exemplary embodiments, the water may be present in the cement compositions in an amount in the range of from about 25% to about 150% by weight of cement ("bwoc"). In certain exemplary embodiments, the water may be present in the cement compositions in the range of from about 30% to about 75% bwoc.

The cement compositions of the invention generally comprise a degrading material, which may function to break the matrix into constituent parts or elements or into simpler compounds, such as breaking up the matrix by a chemical process. For example, the degrading material may be a polymeric material capable of decomposing into sorbable components while in contact with the cement compositions of the present invention. The degrading material may be present in the cement compositions used according to the invention in an amount sufficient to result, upon partial or complete degradation of the degrading material, in a cement that significantly degrades such that its use as a zone isolator to prevent or reduce the passage of fluids or strength structure is temporary. In certain exemplary embodiments of the present invention, the degrading material begins to degrade the cement after the cement composition has set in the wellbore. In certain other exemplary embodiments, the degrading material may degrade the cement before or while the cement composition sets, but not to an extent such that the setting cement structure achieves its purpose as a temporary zone isolator or strength structure. In certain exemplary embodiments, the degrading material may be present in the compositions used according to the invention in an amount in the range of from about 1% to about 25% bwoc. In certain embodiments, the degrading material may be present in the compositions of the invention in an amount in the range of from about 5% to about 15% bwoc.

In choosing the appropriate degrading material, one should consider the matrix degrading products that will result. These products should not significantly affect the treatment operations, but should degrade the properties of the set cement, or matrix, such as lowering of the compressive strength of the cement or matrix. The choice of degrading material also can depend, at least in part, on the conditions of the well, e.g., well bore temperature.

Nonlimiting examples of degrading materials that may be used in the invention include certain polymer materials that are capable of generating acids upon degradation. These polymer materials may herein be referred to as "polymeric acid precursors." These materials are typically solids at room temperature. The polymeric acid precursor materials include the polymers and oligomers that hydrolyze or degrade in certain chemical environments under known and controllable conditions of temperature, time and pH to release organic acid molecules that may be referred to as "monomeric organic acids." As used herein, the expression "monomeric organic acid" or "monomeric acid" may also include dimeric acid or acid with a small number of linked monomer units that function similarly, for purposes of the invention described herein, to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxybutyric acid, referred to as polyhydroxybutyrate; 2-hydroxyvaleric acid, referred to as polyhydroxyvalerate; epsilon caprolactone, referred to as polyepsilon caprolactone or polyprolactone; the polyesters obtained by esterification of hydroxyl aminoacids such as serine, threonine and tyrosine; and the copolymers obtained by mixtures of the monomers listed above. A general structure for the above-described homopolyesters is:

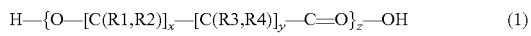  (1)

where,

R1, R2, R3, R4 is either H, linear alkyl, such as $CH_3$, $CH_2CH_3$ $(CH_2)_nCH_3$, branched alkyl, aryl, alkylaryl, a functional alkyl group (bearing carboxylic acid groups, amino groups, hydroxyl groups, thiol groups, or others) or a functional aryl group (bearing carboxylic acid groups, amino groups, hydroxyl groups, thiol groups, or others);

x is an integer between 1 and 11;

y is an integer between 0 and 10; and z is an integer between 2 and 50,000.

In the appropriate conditions (pH, temperature, water content) polyesters like those described herein can hydrolyze and degrade to yield hydroxycarboxylic acid and compounds that pertain to those acids referred to in the foregoing as "monomeric acids."

One example of a suitable polymeric acid precursor, as mentioned above, is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. The polymers described herein are essentially linear. The degree of polymerization of the linear polylactic acid can vary from a few units (2-10 units) (oligomers) to several thousands (e.g. 2000-5000). Cyclic structures may also be used. The degree of polymerization of these cyclic structures may be smaller than that of the linear polymers. These cyclic structures may include cyclic dimers.

Another example is the polymer of glycolic acid (hydroxyacetic acid), also known as polyglycolic acid ("PGA"), or polyglycolide. Other materials suitable as polymeric acid precursors are all those polymers of glycolic acid with itself or other hydroxy-acid-containing moieties, as described in U.S. Pat. Nos. 4,848,467; 4,957,165; and 4,986,355, which are herein incorporated by reference.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. Additionally, random copolymers of lactic acid and glycolic acid and block copolymers of polylactic acid and polyglycolic acid may be used. Combinations of the described homopolymers and/or the above-described copolymers may also be used.

Other examples of polyesters of hydroxycarboxylic acids that may be used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

Polyesters obtained by esterification of other hydroxyl-containing acid-containing monomers such as hydroxyaminoacids may be used as polymeric acid precursors. Naturally occurring aminoacids are L-aminoacids. Among the 20 most common aminoacids the three that contain hydroxyl groups are L-serine, L-threonine, and L-tyrosine. These aminoacids may be polymerized to yield polyesters at the appropriate temperature and using appropriate catalysts by reaction of their alcohol and their carboxylic acid group. D-aminoacids are less common in nature, but their polymers and copolymers may also be used as polymeric acid precursors.

NatureWorks, LLC, Minnetonka, Minn., USA, produces solid cyclic lactic acid dimer called "lactide" and from it produces lactic acid polymers, or polylactates, with varying molecular weights and degrees of crystallinity, under the generic trade name NATUREWORKS™ PLA. The PLA's currently available from NatureWorks, LLC have number averaged molecular weights (Mn) of up to about 100,000 and weight averaged molecular weights (Mw) of up to about 200,000, although any polylactide (made by any process by any manufacturer) may be used. Those available from NatureWorks, LLC typically have crystalline melt temperatures of from about 120 to about 170° C., but others are obtainable. Poly(d,l-lactide) at various molecular weights is also commercially available from Bio-Invigor, Beijing and Taiwan. Bio-Invigor also supplies polyglycolic acid (also known as polyglycolide) and various copolymers of lactic acid and glycolic acid, often called "polyglactin" or poly(lactide-co-glycolide).

The extent of the crystallinity can be controlled by the manufacturing method for homopolymers and by the manufacturing method and the ratio and distribution of lactide and glycolide for the copolymers. Additionally, the chirality of the lactic acid used also affects the crystallinity of the polymer. Polyglycolide can be made in a porous form. Some of the polymers dissolve very slowly in water before they hydrolyze.

In the present invention, amorphous polymers may be useful in certain applications. An example of a commercially available amorphous polymer is that available as NATUREWORKS 4060D PLA, available from NatureWorks, LLC, which is a poly(DL-lactic acid) and contains approximately 12% by weight of D-lactic acid and has a number average molecular weight (Mn) of approximately 98,000 g/mol and a weight average molecular weight (Mw) of approximately 186,000 g/mol.

Other polymer materials that may be useful are the polyesters obtained by polymerization of polycarboxylic acid derivatives, such as dicarboxylic acids derivatives with polyhydroxy containing compounds, in particular dihydroxy containing compounds. Polycarboxylic acid derivatives that may be used are those dicarboxylic acids such as oxalic acid, propandioic acid, malonic acid, fumaric acid, maleic acid, succinic acid, glutaric acid, pentanedioic acid, adipic acid, phthalic acid, isophthalic acid, terephthalic acid, aspartic acid, or glutamic acid; polycarboxylic acid derivatives such as citric acid, poly and oligo acrylic acid and methacrylic acid copolymers; dicarboxylic acid anhydrides, such as, maleic anhydride, succinic anhydride, pentanedioic acid anhydride, adipic anhydride, phthalic anhydride; dicarboxylic acid halides, primarily dicarboxylic acid chlorides, such as propandioic acid chloride, malonyl chloride, fumaroil chloride, maleyl chloride, succinyl chloride, glutaroyl chloride, adipoil chloride, phthaloil chloride. Useful polyhydroxy containing compounds are those dihydroxy compounds such as ethylene glycol, propylene glycol, 1,4 butanediol, 1,5 pentanediol, 1,6 hexanediol, hydroquinone, resorcinol, bisphenols such as bisphenol acetone (bisphenol A) or bisphenol formaldehyde (bisphenol F); polyols such as glycerol. When both a dicarboxylic acid derivative and a dihydroxy compound are used, a linear polyester results. It is understood that when one type of dicarboxylic acid is used, and one type of dihydroxy compound is used, a linear homopolyester is obtained. When multiple types of polycarboxylic acids and/or polyhydroxy containing monomer are used copolyesters are obtained. According to the Flory Stockmayer kinetics, the "functionality" of the polycarboxylic acid monomers (number of acid groups per monomer molecule) and the "functionality" of the polyhydroxy containing monomers (number of hydroxyl groups per monomer molecule) and their respective concentrations, will determine the configuration of the polymer (linear, branched, star, slightly crosslinked or fully crosslinked). All these configurations can be hydrolyzed or "degraded" to carboxylic acid monomers, and therefore can be considered as polymeric acid precursors. As a particular case example, not willing to be comprehensive of all the possible polyester structures one can consider, but just to provide an indication of the general structure of the most simple case one can encounter, the general structure for the linear homopolyesters of the invention is:

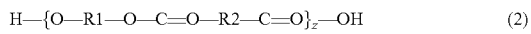

(2)

where,

R1 and R2, are linear alkyl, branched alkyl, aryl, alkylaryl groups; and z is an integer between 2 and 50,000.

Other examples of suitable polymeric acid precursors are the polyesters derived from phthalic acid derivatives such as polyethyleneterephthalate (PET), polybutylentetherephthalate (PBT), polyethylenenaphthalate (PEN), and the like.

In the appropriate conditions (pH, Temperature, water content) polyesters like those described herein can "hydrolyze" and "degrade" to yield polycarboxylic acids and polyhydroxy compounds, irrespective of the original polyester being synthesized from either one of the polycarboxylic acid derivatives listed above. The polycarboxylic acid compounds the polymer degradation process will yield are also considered monomeric acids.

Other examples of polymer materials that may be used are those obtained by the polymerization of sulfonic acid derivatives with polyhydroxy compounds, such as polysulphones or phosphoric acid derivatives with polyhydroxy compounds, such as polyphosphates.

Such solid polymeric acid precursor material may be capable of undergoing an irreversible breakdown into fundamental acid products downhole. In a further exemplary embodiment, the products may be sorbable into the matrix. As referred to herein, the term "irreversible" will be understood to mean that the solid polymeric acid precursor material, once broken downhole, should not reconstitute while downhole, e.g., the material should break down in situ but should not reconstitute in situ. The term "break down" refers to both the two relatively extreme cases of hydrolytic degradation that the solid polymeric acid precursor material may undergo, e.g., bulk erosion and surface erosion, and any stage of degradation in between these two. This degradation can be a result of, inter alia, a chemical reaction. The rate at which the chemical reaction takes place may depend on, inter alia, the chemicals added, temperature and time. The break down of solid polymeric acid precursor materials may or may not depend, at least in part, on its structure. For instance, the presence of hydrolyzable and/or oxidizable linkages in the backbone often yields a material that will break down as described herein. The rates at which such polymers break down are dependent on factors such as, but not limited to, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer breaks down also may be affected by the environment to which the polymer is exposed, e.g., temperature, presence of moisture, oxygen, microorganisms, enzymes, pH, and the like.

Some suitable examples of solid polymeric acid precursor material that may be used in accordance with the present invention include, but are not limited to, those described in the publication of Advances in Polymer Science, Vol. 157 entitled "Degradable Aliphatic Polyesters," edited by A. C. Albertsson, pages 1-138. Examples of polyesters that may be used in accordance with the present invention include homopolymers, random, block, graft, and star- and hyper-branched aliphatic polyesters.

Another class of suitable solid polymeric acid precursor material that may be used in accordance with the present invention include polyamides and polyimides. Such polymers may comprise hydrolyzable groups in the polymer backbone that may hydrolyze under the conditions that exist in cement slurries and in a set cement matrix. Such polymers also may generate byproducts that may become sorbed into a cement matrix. Calcium salts are a nonlimiting example of such byproducts. Nonlimiting examples of suitable polyamides include proteins, polyaminoacids, nylon, and poly(caprolactam). Another class of polymers that may be suitable for use in the present invention are those polymers that may contain hydrolyzable groups, not in the polymer backbone, but as pendant groups. Hydrolysis of the pendant groups may generate a water-soluble polymer and other byproducts that may become sorbed into the cement composition. A nonlimiting example of such a polymer includes polyvinylacetate, which upon hydrolysis forms water-soluble polyvinylalcohol and acetate salts.

A variety of chemical processes may be used to prepare the solid polymeric acid precursor materials that are suitable for use in the compositions of the invention. Examples of such processes include, but are not limited to, polycondensation reactions, ring-opening polymerizations, free radical polymerizations, anionic polymerizations, carbocationic polymerizations, coordinative ring-opening polymerizations, and any other appropriate process. Exemplary polymers that may be used in accordance with the present invention include, but are not limited to, aliphatic polyesters; poly(lactides); poly(glycolides); poly(s-caprolactones); poly(hydroxybutyrates); poly(anhydrides); aliphatic poly(carbonates); ortho esters; poly(orthoesters); and poly(vinylacetates). In an exemplary embodiment of the present invention, the degradable material is poly(vinyl acetate) in bead form, commercially available from Aldrich Chemical Company. In another exemplary embodiment of the present invention, the solid polymeric acid precursor material is poly(lactic acid), commercially available from NatureWorks, LLC.

In certain exemplary embodiments, the rate of break down of the solid polymeric acid precursor material is such that the unhydrolyzed polymer additive retains its structure and shape until it may be suitable for an intended application. For example, it may be desirable for the solid polymeric acid precursor material to remain substantially insoluble (e.g., phase-separated) in the slurry until at least such time as the slurry is placed in a wellbore, preferably at the target area in the wellbore. Furthermore, the rate of break down of the solid polymeric acid precursor material may be varied depending on factors such as the matrix forming material, the degrading material chosen, and the conditions of the operation.

Generally, the degrading materials may be present in the composition in any shape, and may be of any size. In certain exemplary embodiments, the degrading materials may be spherical, substantially spherical, bead-shaped or fiber-shaped. In a further exemplary embodiment of the invention, voids in the shape of the individual particles of the degrading material may form within the matrix.

In other embodiments, the degrading materials may be used in a size, shape and quantity such that no voids are formed in the matrix or sufficient degradation of the matrix results so that any such voids no longer retain the shape of the particles or no voids are formed. It is expected in certain instances that once the degrading material degrades, such as into the monomeric acids previously described, that the cement or matrix forming materials surrounding the degrading material particles will degrade and collapse so that the surrounding structure is not maintained or its strength is severely reduced.

In some other embodiments, the rate of degradation of the degrading material may be such that a barrier may be formed by the degradable material to prevent slurry loss into a permeable zone (e.g., a zone comprising fractures). In a further exemplary embodiment, the barrier may remain without substantially degrading until the cement has set. In yet a further exemplary embodiment, the degrading material used to form the barrier may be flakes or film strips. Examples of such film-forming hydrolyzable polymers include, but are not limited to, polylactic acid, polyvinylacetate, polyglycolic acid, and cellulose acetate. Such polymers also may have the additional advantage of being biodegradable.

In one exemplary embodiment of the present invention, the degrading material may enhance the properties of the cement composition by degrading to form reactive gases, (e.g. carbon dioxide, sulfur oxide, and the like), and/or by degrading to form salts. In a further embodiment, the degrading material may degrade to form gases that react with a cement composition to form an insoluble salt. In still a further embodiment, the gases produced may be inert, and may occupy the space formerly occupied by the degrading material.

Optionally, the compositions used according to the invention may comprise a gas that is added at the surface (e.g., nitrogen, carbon dioxide, air, argon) or a gas-generating additive that may generate a gas in situ at a desired time (e.g., aluminum powder or azodicarbonamide). When included in a cement composition of the present invention, aluminum powder may generate hydrogen gas in situ, and azodicarbonamide may generate nitrogen gas in situ. Other gases and/or gas-generating additives also may be suitable for inclusion in the cement compositions of the present invention. The inclusion of the gas or gas-generating additive in the cement compositions of the invention may allow a cement composition to have "tunable" mechanical properties. For example, a cement composition of the present invention may be formulated to have a desired initial elasticity or flexibility through inclusion of a gas or gas-generating additive, which elasticity or flexibility then may change over time to a second desired value through degradation of the matrix by the degrading material. An example of a suitable gas-generating additive is an aluminum powder or aluminum liquid additive. Where included, a gas may be added at the surface to the cement compositions of the present invention in an amount sufficient to provide a gas concentration under downhole conditions in the range of from about 0.5% to about 30% by volume of the cement composition. Where included, a gas-generating additive may be present in the cement compositions of the present invention in an amount in the range of from about 0.1% to about 5% bwoc. In certain exemplary embodiments where the gas-generating additive is aluminum powder, the aluminum powder may be present in the cement compositions of the present invention in an amount in the range of from about 0.1% to about 1% bwoc. In certain exemplary embodiments where the gas-generating additive is an azodicarbonamide, the azodicarbonamide may be present in the cement compositions used according to the invention in an amount in the range of from about 0.5% to about 5% bwoc. Where included, the gas or gas-generating additive may be added to the compositions in a variety of ways, including, but not limited to, dry blending it with the hollow particles, or injecting it into the cement composition as a liquid suspension while the cement composition is being placed within the subterranean formation.

Optionally, compositions used according to the present invention may comprise a polymer emulsion comprising at least one polar monomer and at least one elasticity-enhancing monomer. In certain exemplary embodiments the polymer emulsion may further comprise a stiffness-enhancing monomer. As used herein, the term "polymer emulsion" will be understood to mean a water emulsion of a rubber or plastic obtained by polymerization. Such a polymer emulsion is commonly known as "latex," and the terms "polymer emulsion" and "latex" are interchangeable herein. Generally, the polar monomer may be selected from the group consisting of: vinylamine, vinyl acetate, acrylonitrile, and the acid, ester, amide, and salt forms of acrylates (cg., acrylic acid). Generally, the elasticity-enhancing monomer may be selected from the group consisting of: ethylene, propylene, butadiene, 1,3-hexadiene, and isoprene. In certain exemplary embodiments that include a stiffness enhancing monomer, the stiffness enhancing monomer may be selected from the group consisting of: styrene, t-butylstyrene, a-methylstyrene, and sulfonated styrene. Generally, the polar monomer may be present in the polymer emulsion in an amount in the range of from about 1% to about 90% by weight of the polymer emulsion. Generally, the elasticity-enhancing monomer may be present in the polymer emulsion in an amount in the range of from about 10% to about 99% by weight of the polymer emulsion. When the polymer emulsion further comprises a stiffness-enhancing monomer, the stiffness-enhancing monomer may be present in the polymer emulsion in an amount in the range of from about 0.01% to about 70% by weight. Varying the amounts of the constituents of a latex may change the properties of the latex, so as to affect the type and degree of properties of the cement compositions of the present invention that optionally may include such latex. For example, when a latex having a high concentration of an elasticity-enhancing monomer (e.g., butadiene), is incorporated into a cement composition of the present invention, the elasticity-enhancing monomer may increase, inter alia, the elastomeric properties of the cement composition, For example, a latex having a high concentration of a stiffness-enhancing monomer (e.g., styrene), or a polar monomer (e.g., acrylonitrile), may decrease, inter aha, the elastomeric properties of the cement composition. Thus, one of ordinary skill in the art, with the benefit of this disclosure, will appreciate that the mechanical properties of a cement composition may be adjusted by varying the constituents of a polymer emulsion that may be incorporated in the composition. In certain exemplary embodiments, a polymer emulsion may be added to the compositions of the present invention by mixing the polymer emulsion with water, which then may be mixed with a hydraulic cement to form a cement composition. In certain exemplary embodiments, a polymer emulsion may be added to the cement compositions of the present invention by evaporating the water from a latex prepared as a water emulsion, thereby forming a dry polymer additive. The dry polymer additive then may be mixed with a hydraulic cement, which then may be mixed with water to form a cement composition. An example of a suitable polymer emulsion is an aqueous styrene butadiene latex. Where present, the polymer emulsion may be included within the cement composition in an amount in the range of from about 5% to about 100% by weight of the water therein. In certain exemplary embodiments, the cement composition that comprises a polymer emulsion further may comprise a surfactant, inter alia, to stabilize the polymer emulsion. When included, the surfactant may be present in the cement composition in an amount in the range of from about 10% to about 20% by weight of the polymer emulsion.

Some embodiments of the invention also include the use of a hydrogel component. As used herein the term hydrogel is a broad phrase referring in general to a polymer that swells when exposed to aqueous environment. Hydrogel polymers useful in the present invention are preferably formed of a crosslinked polymer network. When this polymer network is exposed or immersed in a suitable solvent, the polymer chains in the network become solvated. In certain cases, crosslinkers may be provided to prevent the complete mixing of the polymer chains and the solvent by providing an elastic restoring force that counters the expansion of the network. When used, the polymer network of the hydrogel may be formed from any suitable polymeric material. In a preferred embodiment, the polymer network is formed from cross-linked polymers including water-soluble methylcellulose, cellulose acetate phthalate, and hydroxypropyl methylcellulose polymers, poly (ethylene oxide) polymers, guar and its derivatives, polyacrylamide, polyvinylpyrolidone, polyacrylic acid, polyvinylpyrolidone, oligo maleinate copolymers, oligo maleinate oligomers, allyl maleate oligomers, silicon-based materials, and fluoro-silicone based materials. The polymer used to form the hydrogel may also be in a metal complex form. When incorporated, the hydrogel may be added in an amount from about 1 to about 90 parts by weight hydrogel based upon 100 parts of total composition, more preferably, the ratio of hydrogel to base material is from about 2 to about 25 parts by weight hydrogel based upon 100 parts of total composition.

Additional additives optionally may be added to the compositions used according to the present invention as deemed appropriate by one skilled in the art with the benefit of this disclosure. Examples of such additives include fluid loss control additives, defoamers, dispersing agents, set accelerators, salts, formation conditioning agents, extending agents, weighting agents, set retarders, hollow glass or ceramic beads, elastomers, fibers and the like.

In certain exemplary embodiments, cement compositions used according to the invention may be prepared by dry blending the degradable materials with the cement before the addition of water, or by mixing the degradable materials with water before it is added to the cement, or by mixing the degrading material with the cement slurry consecutively with or after the addition of water. In certain preferred embodiments, the degrading materials are dry blended with the cement before the addition of water. In other exemplary embodiments, the degrading materials may be pre-suspended in water and injected into the cement composition, or into the cement composition as an aqueous slurry, if desired.

An example of a method of the present invention comprises: providing a cement composition that comprises a hydraulic cement, and a degrading material; placing the cement composition in a wellbore penetrating a subterranean formation; allowing the cement composition to set forming a temporary matrix therein; performing a treatment operation on the formation, and allowing the degrading material to degrade the set cement matrix. In certain exemplary embodiments of the present invention, the subterranean formation may comprise a multilateral well. In certain exemplary embodiments of the present invention, the subterranean formation may comprise a well that comprises an expandable tubular. Another example of a method of the present invention is a method of enhancing the mechanical properties of a cement composition comprising adding a degrading material to the cement composition, and allowing the degradable material to degrade the cement.

In certain situations where the subterranean formation is has a high water content and slowing or stop the flow of water is the objective then the water in the slurry may be replaced by a hydrocarbon such as diesel, crude oil, kerosene or other refined oil based products. This enables the water in the formation to create the environment for hydrating the cement and degrading the matrix without over dilution of the slurry.

The following examples serve to further illustrate the invention.

EXAMPLES

Example 1

Cement systems were formulated according to the formulations A to D presented in Table 1 below. The concentrations of the non-reactive polymer particle and the PLA were the only thing that changed from one system to another, with the total volume occupied by the two particles being constant. The formulations were based on the optimum particle packing concept, as described in U.S. Pat. No. 5,518,996. The non-degradable polymer particle was a polypropylene particle as described in U.S. Pat. No. 6,645,288. The degradable polymeric particle was a polylactide resin particle (PLA). The total volume of reactive and non-reactive polymer particles remained the same for all the tests. The density of the slurries increased with increasing concentration of the PLA and decreasing concentration of the polypropylene particle because the PLA has a higher density than the polypropylene. The ratio of reactive:non-reactive polymer particles changed and consequently so did the ratio of reactive particle to cement.

The slurry additives were as follows:

Antifoam agent—silicone based emulsion—to prevent foaming during mixing.

Calcium chloride—accelerator—to provide early compressive strength development at ambient temperature.

Dispersant—a non-retarding dispersant of the family described in U.S. Pat. No. 6,953,091

Anti-settling agent—welan gum—to provide a stable slurry with no sedimentation.

TABLE 1

|  | A | B | C | D | 0 |
|---|---|---|---|---|---|
| Class G cement | 100 | 100 | 100 | 100 | 100 |
| Fine silica | 23.65% bwoc | 23.65% bwoc | 23.65% bwoc | 23.65% bwoc | 23.65% bwoc |
| PLA | 20.6% bwoc | 41.2% bwoc | 61.9% bwoc | 113% bwoc | — |

TABLE 1-continued

| | A | B | C | D | 0 |
|---|---|---|---|---|---|
| Non-reactive Polymer particle | 36.2% bwoc | 28.1% bwoc | 20.1% bwoc | — | 44.2% bwoc |
| Solid volume fraction | 57% | 57% | 57% | 57% | 57% |
| Density | 1580 kg m$^{-3}$ | 1660 kg m$^{-3}$ | 1740 kg m$^{-3}$ | 1930 kg m$^{-3}$ | 1500 kg m$^{-3}$ |
| Antifoam | 2.7 L/tonne blend | 2.7 L/tonne blend | 2.7 L/tonne blend | 2.7 L/tonne blend | 2.7 L/tonne blend |
| Calcium chloride | 3% bwoc | 3% bwoc | 3% bwoc | 3% bwoc | 3% bwoc |
| Dispersant | 8 L/tonne blend | 8 L/tonne blend | 8 L/tonne blend | 8 L/tonne blend | 8 L/tonne blend |
| Anti-settling agent | 0.3% bwoc | 0.3% bwoc | 0.3% bwoc | 0.3% bwoc | 0.3% bwoc |

The different slurries were mixed according to procedures defined in ISO 10426-2, poured into plastic moulds and then placed in a curing chamber to set at a given temperature and at a pressure of 20.7 MPa. After the required time the samples were removed from the chamber and cylindrical samples (25 mm diameter and 48 mm long) were prepared. The unconfined compressive strength (UCS) of some of the samples was measured immediately after preparation of the cylinders (method described in SPE101310) while others were placed in water baths at the same temperature as the initial curing temperature. Samples were then removed periodically to measure the compressive strength after different aging times.

Example 2

Systems A, C and 0 from Example 1 were cured for 3 days at 27° C. and then the compressive strength was measured. The results are presented in Table 2 below.

TABLE 2

| | System A | System C | System 0 |
|---|---|---|---|
| UCS | 7.4 MPa | 0.8 MPa | 14.8 MPa |

As can be seen in Table 2, System A had sufficient strength to be used in oil well cementing operations. System C with 62% PLA had a very low UCS. The strength os systems A and C were lower than System 0 (no reactive particle) indicating that the PLA reacted, leading to degradation of the cement matrix.

Example 3

Systems A, B, C and 0 from Example 1 were cured for various times at 40° C. and the UCS measured. The results are presented in Table 3 below.

TABLE 3

| | UCS (MPa) | | | |
|---|---|---|---|---|
| Curing time | 1 day | 2 days | 5 days | 14 days |
| System A | 10.1 | 9.3 | 10.7 | 11.3 |
| System B | 5.8 | 5.5 | — | 6.2 |
| System C | 0.7 | — | — | — |
| System 0 | 13.6 | — | — | — |

System A developed sufficient compressive strength after 1 day. There was no change in the UCS for two weeks, indicating that the equilibrium UCS had been achieved. System A cured at 40° C. had a higher UCS than the same system cured at 27° C. System B developed a lower compressive strength than System A because of the higher concentration of PLA in formulation B. However, the UCS is still suitable for application in oil wells (i.e. >3.45 MPa). The UCS did not change between 1 day and 14 days. At 40° C., the same as at 27° C., System C did not generate high compressive strength because of the high concentration of PLA in the formulation. In all cases the strength of the systems was lower than System 0 (no PLA).

Example 4

Systems A, D and 0 from Example 1 were cured at 60° C. for various times and the UCS measured. The results are presented in Table 4 below.

TABLE 4

| | UCS (MPa) | | | | |
|---|---|---|---|---|---|
| Curing time | 1 day | 2 days | 3 days | 5 days | 14 days |
| System A | 8.9 | 10.1 | — | 11.7 | 11.7 |
| System D | — | — | 0.55 | — | — |
| System 0 | 14.2 | | | | |

System A developed sufficient compressive strength after 1 day and the UCS increased slightly with time. Within experimental error, the UCS of system A cured at 60° C. is the same as when it is cured at 40° C. System D had an extremely low UCS. This is due to the high concentration of PLA. In both cases the UCS is lower than that of System 0 (no PLA).

Example 5

System B from Example 1 was cured for 24 hours in a curing chamber at a temperature of 40° C. Samples were removed from the curing chamber and a couple placed in a water bath at 40° C. and others in a water bath at 60° C. Within experimental error there was no effect of exposing sample B cured initially at 40° C. to a temperature of 60° C. The results are presented in Table 5 below.

TABLE 5

| | UCS (MPa) | |
|---|---|---|
| 1 day at 40° C.+ | 40° C. | 60° C. |
| 1 day | 6.3 | 5.7 |
| 4 days | | 6.1 |
| 8 days | | 6.4 |

Example 6

A class G cement system was formulated at a density of 1890 kg m$^{-3}$. The additives used are as described above in Example 1. The slurry was mixed according to procedures described in ISO 10426-2. The slurry was then split into several portions and the PLA additive added at concentrations of 1.45% bwoc, 12.9% bwoc and 27.0% bwoc and mixed into the slurry. The systems were cured at room temperature for 14 days and the UCS subsequently measured. The results are presented in Table 6 below.

TABLE 6

|  | Mass for 600 mL of slurry |
| --- | --- |
| Class G cement | 768.5 g |
| Antifoam | 2.05 g |
| Dispersant | 4.22 g |
| Calcium chloride | 15.37 g |
| Tap water | 343.9 g |

The UCS of the system with 1.48% bwoc PLA had a UCS of 21 MPa. The UCS of the system with 14.8% bwoc PLA also had a UCS of 21 MPa. The UCS of the system with 36.9% bwoc PLA could not be determined as the samples were too weak and crumbled during sample preparation. These results show that increasing the concentration of PLA from 1.45% to 12.9% bwoc has no significant effect on the UCS of the conventional class G cement system.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method of treating a subterranean formation comprising:
   a. forming a temporary matrix by:
      i. providing a composition comprising a matrix forming material and a matrix degrading material, wherein the matrix degrading material is capable of degrading the matrix forming material after a period of time when subjected to conditions of the subterranean formation, wherein the matrix forming material is cement, and the composition further comprises water, wherein the water is present in the composition in an amount sufficient to form a pumpable slurry;
      ii. placing the composition into a wellbore penetrating the subterranean formation; and,
      iii. allowing the composition to form a matrix within the wellbore, whereby the matrix is capable of at least one of significantly reduces the passage of fluid across or near the matrix or provides structural strength;
   b. performing a treatment operation on the subterranean formation or wellbore; and
   c. allowing the matrix degrading material to degrade and break the matrix.

2. The method of claim 1, wherein the degrading of the matrix comprises reducing the compressive strength of the matrix.

3. The method of claim 1, wherein the treatment operation is substantially performed before expiration of the period of time.

4. The method of claim 1, wherein the matrix forming material is an acid soluble cementitious material.

5. The method of claim 1, wherein the matrix degrading material is a polymeric acid precursor.

6. The method of claim 1, wherein degrading of the matrix degrading material forms no voids in the matrix.

7. The method of claim 1, wherein the matrix degrading material is in the form of fibers.

8. The method of claim 1, wherein providing the temporary matrix includes incorporating non-degradable polymer particles in the matrix.

9. The method of claim 1, wherein the matrix forming material is a cement formed from a blend of different particle sizes of at least two of fine, medium and coarse materials.

10. The method of claim 1, wherein the water is present in the composition in an amount in the range of from about 25% to about 150% by weight of the cement.

11. The method of claim 1, wherein the water is present in the composition in an amount in the range of from about 30% to about 75% by weight of the cement.

12. The method of claim 1, wherein the cement is selected from the group consisting of Portland cements, pozzolanic cements, gypsum cements, high alumina content cements, phosphate cements, silica cements, and high alkalinity cements.

13. The method of claim 1, wherein the degrading material comprises a material that degrades at a desired time after contact with the matrix formed in the wellbore.

14. The method of claim 1, wherein the degrading material comprises a material that prevents fluid loss into the subterranean formation.

15. The method of claim 1, wherein the degrading material breaks down after the cement sets in the wellbore.

16. The method of claim 1, wherein the degrading material breaks down before or while the cement sets in the wellbore.

17. The method of claim 1, wherein the degrading material generates at least one of a gas, salt, acid, base, or combination thereof.

18. The method of claim 1, wherein the degrading material is selected from at least one of homopolymers of lactic acid, glycolic acid, hydroxybutyrate, hydroxyvalerate and epsilon caprolactone, random copolymers of at least two of lactic acid, glycolic acid, hydroxybutyrate, hydroxyvalerate, epsilon caprolactone, L-serine, L-threonine, L-tyrosine, block copolymers of at least two of polyglycolic acid, polylactic acid, hydroxybutyrate, hydroxyvalerate, epsilon caprolactone, L-serine, L-threonine, L-tyrosine, homopolymers of ethylenetherephthalate (PET), butylenetherephthalate (PBT) and ethylenenaphthalate (PEN), random copolymers of at least two of ethylenetherephthalate, butylenetherephthalate and ethylenenaphthalate, block copolymers of at least two of ethylenetherephthalate, butylenetherephthalate and ethylenenaphthalate and combinations of these.

19. The method of claim 1, wherein providing the temporary matrix includes incorporating an additive selected from at least one of fluid loss control additives, defoamers, dispersing agents, set accelerators, salts, formation conditioning agents, extending agents, weighting agents, set retarders, glass beads, ceramic beads, elastomers, and combinations thereof in the matrix.

20. The method of claim 1, wherein the degrading material is encapsulated.

21. A method of treating a subterranean formation comprising:
- a. forming a temporary matrix by:
  - i. providing a composition comprising a matrix forming material and a matrix degrading material, wherein the matrix degrading material is capable of degrading the matrix forming material after a period of time when subjected to conditions of the subterranean formation, wherein the matrix forming material is cement, and the composition further comprises water, wherein the water is present in the composition in an amount sufficient to form a pumpable slurry;
  - ii. placing the composition into a fracture in a subterranean formation; and,
  - iii. allowing the composition to form a matrix, whereby the matrix at least one of significantly reduces the passage of fluid across or near the matrix or provides structural strength;
- b. performing a treatment operation on the subterranean formation or wellbore; and
- c. allowing the matrix degrading material to degrade and break the matrix.

22. A method of cementing a subterranean formation comprising:
- a. forming a matrix by providing a composition comprising a matrix forming material and a polymeric acid precursor, wherein the matrix forming material is cement, and the composition further comprises water, wherein the water is present in the composition in an amount sufficient to form a pumpable slurry;
- b. placing the composition into the subterranean formation and allowing the composition to form a matrix within the wellbore; and,
- c. allowing the polymeric acid precursor to irreversibly breakdown and degrade the matrix forming material.

* * * * *